B. A. BEHREND.
COIL SUPPORT.
APPLICATION FILED OCT. 19, 1908.
1,122,187.  Patented Dec. 22, 1914.
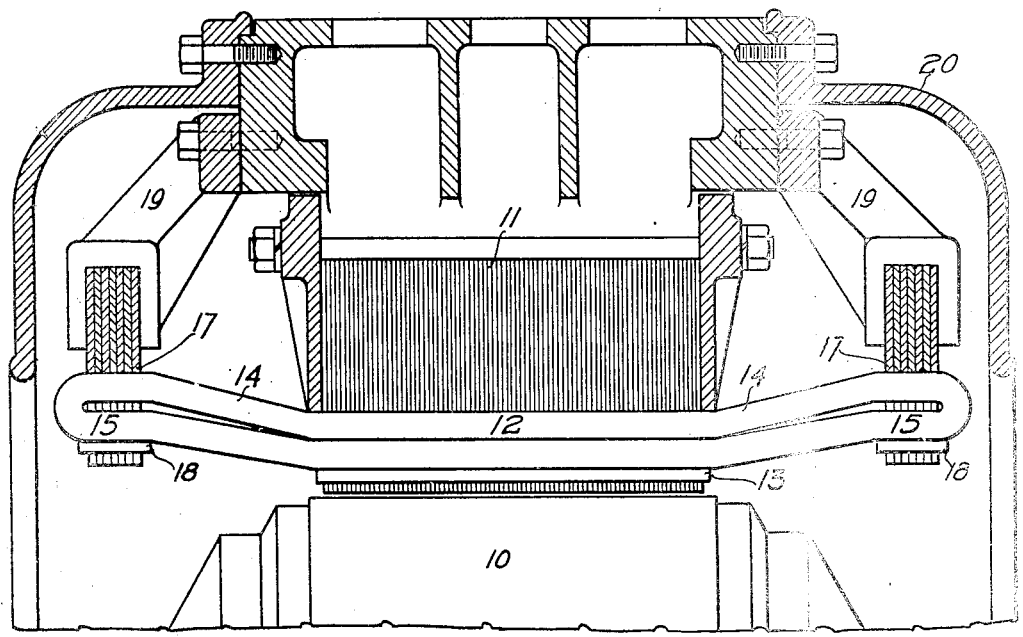
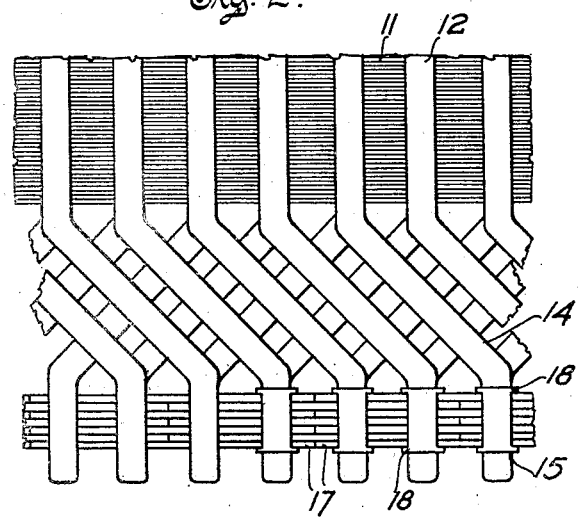
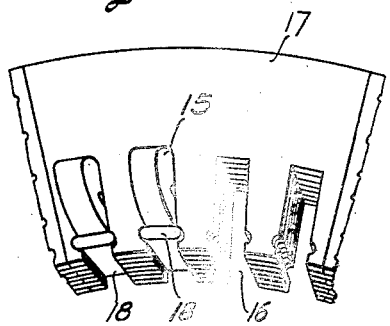
Witnesses:
Rob. E. Stoll.
Chas. L. Byron.
Inventor:
B. A. Behrend.
By
Attorney

UNITED STATES PATENT OFFICE.

BERNARD A. BEHREND, OF MILWAUKEE. WISCONSIN, ASSIGNOR, BY MESNE ASSIGN-MENTS, TO ALLIS-CHALMERS MANUFACTURING COMPANY, A CORPORATION OF DELAWARE.

COIL-SUPPORT.

1,122,187.     Specification of Letters Patent.     Patented Dec. 22, 1914.

Application filed October 19, 1908. Serial No. 458,341.

*To all whom it may concern:*

Be it known that I, BERNARD A. BEHREND, a citizen of the United States, residing at Milwaukee, in the county of Milwaukee and State of Wisconsin, have invented certain new and useful Improvements in Coil-Supports, of which the following is a full, clear, and exact specification.

My invention relates to dynamo-electric machines, and particularly to means for supporting the end turns or end conductors of the windings thereof.

If the end turns or end conductors of the coils of dynamo-electric machines, that is, those parts which normally extend beyond the slots in the core, are not supported in some manner, they are liable to be distorted by the stresses due to the interaction between adjacent magnetic fields and the magnetic fields due to the currents in them. This danger of distortion has heretofore been recognized, and several schemes have been proposed to prevent it.

It is the object of my present invention to provide an improvement on such prior schemes, and to prevent all liability of distortion of the end turns or end conductors in a manner at once simple, inexpensive, and efficient. With this end in view, I provide rings, preferably formed of laminations of some non-magnetic material, which are slotted in a manner similar to the slotting in the core, and fasten the loops of the end turns or end conductors in the slots of these rings. The rings may be supported in any desired manner. While my invention is particularly applicable for supporting the end turns of stator coils, it is also of advantage for supporting the end turns of rotor coils.

The various novel features of my invention will appear from the description and drawings, and will be particularly pointed out in the claims.

Figure 1 is a partial longitudinal section of a dynamo-electric machine in which the end turns of the stator coils are supported in accordance with my invention; Fig. 2 is a development of a portion of one end of said stator coils; and Fig. 3 is an isometric view of a fragment of the ring which supports the end turns, the end turns of two of the coils being shown in place.

The rotor 10 rotates within the laminated stator core 11, which may be supported in any desired manner. The stator coils 12 of the two-layer winding, to which style of winding my invention is particularly applicable, are held in the usual slots of such core by wedges 13. The lower conductor in one slot is connected to the upper conductor in another slot of the stator by the usual end turns, which consists of the oblique portions 14 and the portions 15 parallel to the conductors in the slot. The portions 15 are located in open slots 16 in rings 17, and are held there by wedges 18. The rings 17 are preferably formed of laminæ of some non-conducting material, such as fiber, vulcabeston, or fish paper, though brass or other non-magnetic material could be used. The laminæ of the rings 17 are preferably formed in sections and built up with the joints broken, as indicated in Fig. 3. These sections may be punched out in the same manner as are the laminations of the core 11, and may be made with the same dies or with different dies, according as the end turns are bent away from the rotor or not. In the case shown they would be made with different dies. The rings 17 are supported by brackets 19 fastened in any desired manner to the stator frame. End housings 20 may be provided to inclose and protect the rings 17 and the end turns. With this construction shown, the end turns are firmly supported in an exceedingly simple and inexpensive manner, and the parts are easy to manufacture and assemble.

Many changes in the exact arrangement here shown will be obvious to those skilled in the art, and all such which do not involve a departure from the spirit and scope of my invention I aim to cover in the following claims.

What I claim as new is:

1. In a dynamo-electric machine, the combination of a slotted core, a winding comprising conductors located in slots in said core and end conductors located outside of said slots, an open-slotted laminated ring of non-magnetic material in the slots of which portions of said end conductors are disposed, the slots in said ring opening radially inward, and wedges held in place in the slots of said ring by engagement with the sides of the slots and forming means for securing said end conductors in place in said slots.

2. In a dynamo-electric machine, a rotor and stator, the core of said stator being slotted, a winding comprising conductors having portions located in said slots and end portions located outside of said core, open-slotted rings mounted on said stator, the slots of said rings opening radially inward, the end portions of said conductors located in said slots and wedges in said slots forming the sole means for holding said conductors in place in said rings.

3. In a dynamo-electric machine, the combination of a slotted core, conductors located partially in the slots in said core and partially outside of said slots, an open-slotted ring in the slots in which are supported parts of said conductors which are outside of the core, the slots opening radially inward, and wedges forming the sole means for holding in place the parts of the conductor which are located in the slots in said ring.

Milwaukee, Wisconsin, October 14, 1908.

In testimony whereof I affix my signature, in the presence of two witnesses.

BERNARD A. BEHREND.

Witnesses:
CHAS. E. LORD,
H. C. CASE.